United States Patent [19]

Fenger

[11] Patent Number: 5,701,476
[45] Date of Patent: Dec. 23, 1997

[54] METHOD AND APPARATUS FOR DYNAMICALLY LOADING A DRIVER ROUTINE IN A COMPUTER MEMORY

[75] Inventor: Russell J. Fenger, Aloha, Oreg.

[73] Assignee: Intel Corporation, Santa Clara, Calif.

[21] Appl. No.: 346,038

[22] Filed: Nov. 29, 1994

[51] Int. Cl.$^6$ .................................................. G06F 9/445
[52] U.S. Cl. ............................................ 395/652; 395/680
[58] Field of Search ..................................... 395/650, 700

[56] References Cited

U.S. PATENT DOCUMENTS

| | | | |
|---|---|---|---|
| 5,136,709 | 8/1992 | Shirakabe et al. | 395/710 |
| 5,247,678 | 9/1993 | Littleton | 395/710 |
| 5,353,411 | 10/1994 | Nakaosa et al. | 395/710 |
| 5,355,498 | 10/1994 | Provino et al. | 395/651 |
| 5,412,798 | 5/1995 | Garney | 395/651 |

*Primary Examiner*—Kevin A. Kriess
*Assistant Examiner*—John Q. Chavis
*Attorney, Agent, or Firm*—Blakely, Sokoloff, Taylor & Zafman

[57] ABSTRACT

A device driver in a computer system is dynamically loaded from a storage device to the computer system memory during run time to reduce the amount of memory required to store the device driver. During an initialization period, an initial copy of the device driver is loaded into the computer system memory from the storage device. After the initialization period, the device driver specifies, to the operating system, a minimum resident subset of the device driver of the initial copy which is to be retained in the computer system memory, thereby reducing the amount of computer system memory required to store the device driver. During run time of the device driver, a subsequent copy of the device driver is loaded from the storage device into the computer system memory. The computer system executes the device driver by using both the minimum resident subset of the device driver of the initial copy and a dynamically loaded subset of the device driver of the subsequent copy. The computer system memory for storing the dynamically loaded subset of the device driver of the subsequent copy is reallocated after run time.

20 Claims, 6 Drawing Sheets

METHOD AND APPARATUS FOR DYNAMICALLY LOADING A DRIVER ROUTINE IN A COMPUTER MEMORY

FIELD OF THE INVENTION

The present invention relates to device drivers for computer systems, and more particularly to dynamically loading a device driver.

BACKGROUND OF THE INVENTION

FIG. 1a illustrates a prior art memory map for a computer system configured for running the Microsoft® disk operating system (MS-DOS). The memory map 106 includes a conventional memory area 111, ranging from 0 to 1.0 mega bytes (MB). In an area of memory below 640 kilo bytes (KB) within the conventional memory area 111, resides an interrupt vector table 112, DOS files 114, device drivers 116, terminate and stay resident (TSR) programs 118, and an application area 122. In addition, a video area 124 and a system area 126 reside in an upper portion of the conventional memory area 111. When a computer system is operating in real mode, only the conventional memory area 111 is accessible to the computer system.

As is shown in the memory map 106 illustrated in FIG. 1a, large usage of memory by, for example, the device drivers 116 and the TSRs 118, result in reduced amounts of memory available for the application area 122. Therefore, it is desirable to reduce the memory used by the TSRs 118 and the device drivers 116.

FIG. 1b illustrates a prior art memory map for a computer system configured for running a Microsoft® Windows enhanced mode operating system. The Microsoft® Windows operating system environment permits multi-tasking of program applications in an IBM® compatible personal computer system. The Windows operating system supports an enhanced mode. The Windows enhanced mode, in addition to the features found in the Windows standard mode, creates the use of disk operating system (DOS) virtual machines (VMs). A memory map 200 illustrated in FIG. 1b includes the conventional memory area 111, ranging from 0 to 1.0 mega bytes (MB), and in addition, an extended memory area 127. The extended memory area 127 provides additional system memory for use when the Microsoft® Windows enhanced mode operating system is operating in protected mode.

The Windows enhanced mode utilizes a virtual 8086 mode on an Intel® architecture microprocessor to emulate a DOS environment for operation of each DOS VM. A first virtual machine holds Windows itself, all the Windows applications, and any DOS TSRs and device drivers which were initialized before Windows was loaded. The DOS VMs are limited to 1.0 MB of system memory. The real mode portion of the DOS VM emulates an Intel® 8086 system. In order to create a DOS VM to run a DOS application, Windows makes a virtual copy of the conventional memory area 111 memory below the 1 MB boundary into a region of the extended memory 127. The copied region becomes the address space of a DOS virtual machine. The Windows software maps DOS, the device drivers, and all the TSRs programs of the original real mode memory area into the DOS VM address space. Therefore, all routines residing in the conventional memory area prior to the invocation of Windows are mapped to the same location within each DOS VM. Consequently, reducing the size of a device driver in the conventional memory reduces the amount of memory consumed for each DOS VM.

SUMMARY OF THE INVENTION

A device driver for a peripheral device in a computer system is dynamically loaded from a storage device to the computer system memory during run time to reduce the amount of memory required to store the device driver. During an initialization period, an initial copy of the device driver is loaded into the computer system memory from the storage device. After the initialization period, the device driver specifies, to the operating system, a minimum resident subset of the device driver of the initial copy which is to be retained in the computer system memory, thereby reducing the amount of memory required to store the device driver. During run time of the device driver, a subsequent copy of the device driver is loaded from the storage device into the computer system memory. The subsequent copy of the device driver contains at least the minimum resident subset of the device driver and a dynamically loaded subset of the device driver. The computer system executes the device driver by using both the minimum resident subset of the device driver of the initial copy and the dynamically loaded subset of the device driver of the subsequent copy.

In one embodiment, the computer system operating system is a disk operating system (DOS), and the device driver includes a dynamic loading function, static data, run time interfaces, and an initialization function. The minimum resident subset of the device driver of the initial copy for storage includes the dynamic loading function and the static data. In order to initialize the device driver, a path for the device driver stored in the storage device is obtained and stored. An ending location of the minimum device driver is determined and is communicated to the operating system. The loading of a copy of the device driver includes allocating memory for the copy of the device driver, and reading the device driver from the storage device into the memory allocated. In order to call the device driver at run time, a pointer, containing the code segment for the memory allocated and an offset to a starting location of the dynamically loaded subset of the device driver of the subsequent copy, i.e., the run time interfaces, is built.

The present invention has application for a computer system that contains a peripheral device. The device driver is used to interface the peripheral device of the computer system to the operating system. For example, the device driver of the present invention may be a configuration manager/driver used to interface a personal computer system containing an Intel® architecture microprocessor to a peripheral device conforming to the Industry Standard Architecture (ISA) plug and play standard.

BRIEF DESCRIPTION OF THE DRAWINGS

The features and advantages of the present invention will be apparent from the following detailed description of the invention with references to the following drawings.

DETAILED DESCRIPTION

Figure 1A:
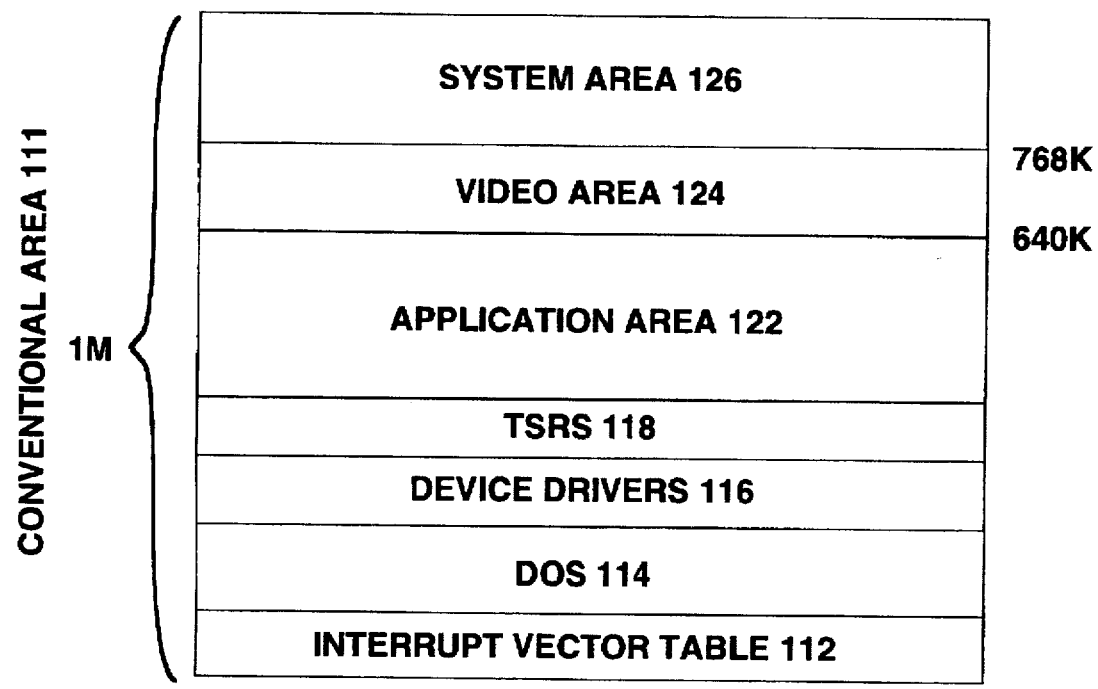
FIG. 1a illustrates a prior art memory map for a computer system configured for running the Microsoft® disk operating system.
Figure 1B:
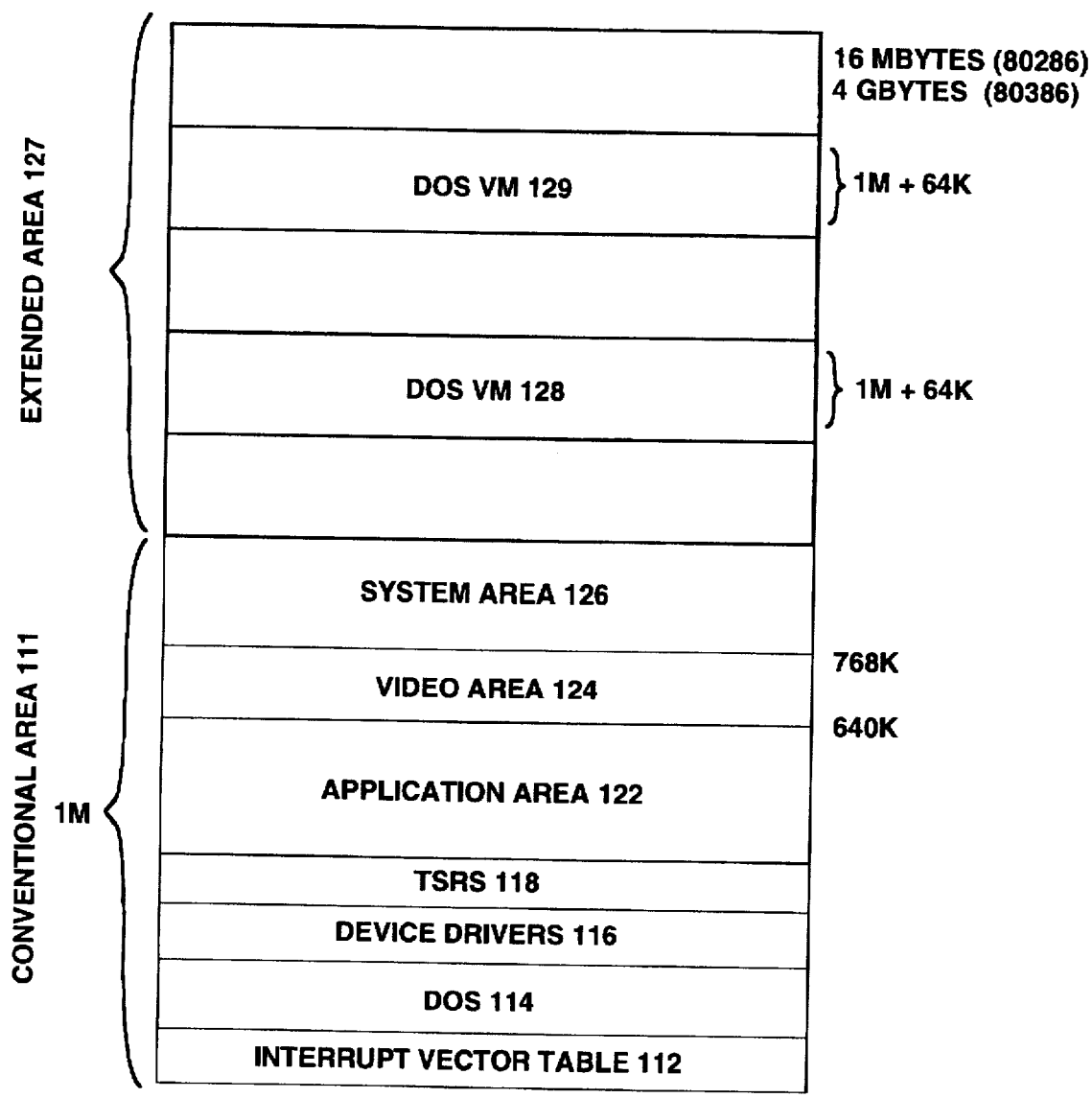
FIG. 1b illustrates a prior art memory map for a computer system configured for running a Microsoft® Windows enhanced mode operating system.
Figure 2:
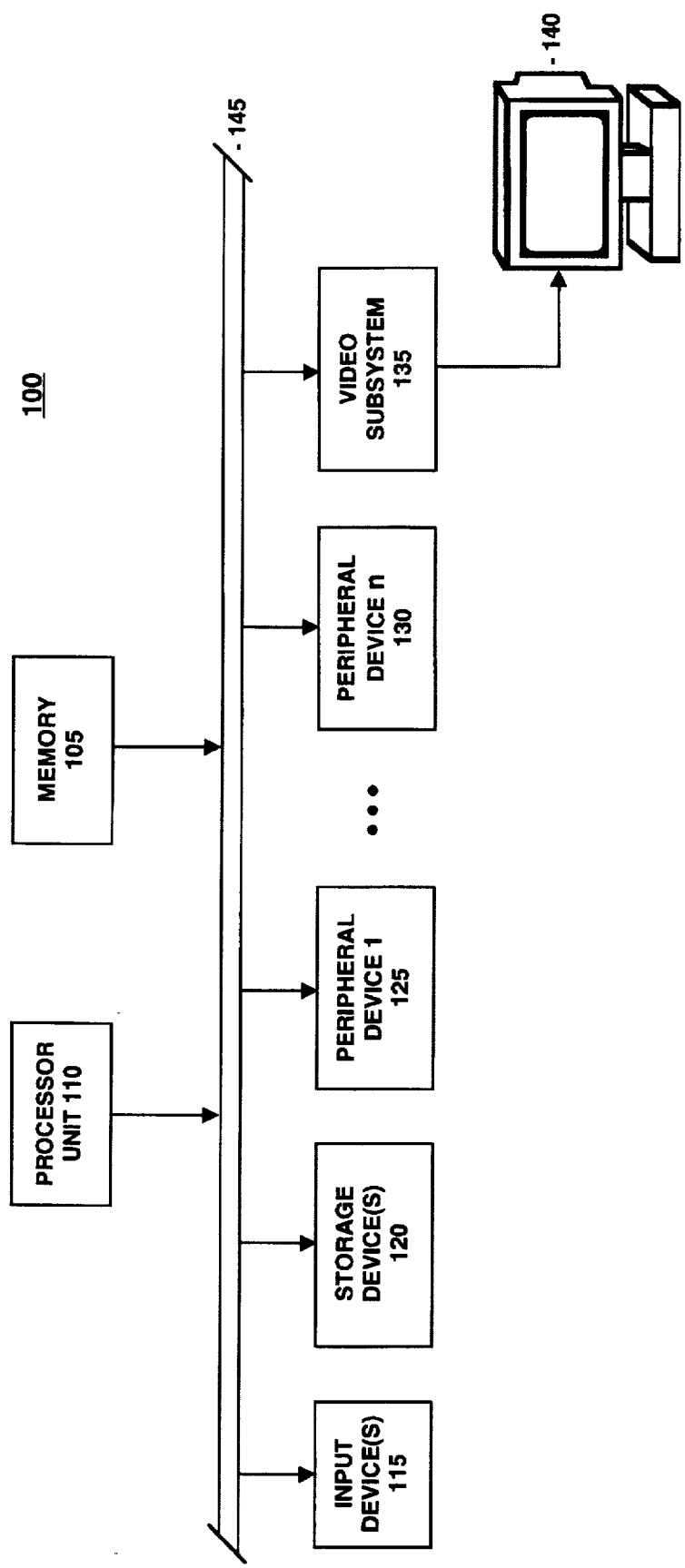
FIG. 2 illustrates a general purpose computer system utilized to implement the present invention.

FIG. 2 illustrates a general purpose computer system utilized to implement the present invention. The computer system 100 contains a processor unit 110 and a memory 105 coupled via a computer bus 145. The processor unit 110 may contain a single microprocessor or multiple microprocessors, including co-processors. In a preferred embodiment, the processor unit 110 contains an Intel® architecture microprocessor, such as an Intel® Pentium® microprocessor. The memory 105 contains the main memory for the computer system 100 including any cache memory.

As shown in FIG. 2, the computer system 100 also contains input devices 115, such as a mouse, keyboard or other well known devices for inputting information into the computer system 100. A storage device 120, such as a floppy disk drive, a hard disk drive or a compact disk read only memory (CD-ROM) is coupled to the bus 145. The computer system 100 further includes a video subsystem 135 coupled to an output display 140. Although the computer system 100 is shown as being coupled by a single bus 145, any bus configuration, such as a local or microprocessor bus for coupling the processor unit 110 and the memory 105, and a system bus for coupling the peripheral devices may be implemented. The processor unit 110, memory 105, input device(s) 115, storage device(s) 120, video subsystem 135, and output display 140 are those devices typically found in a computer system, and in fact, the computer system 100 is intended to represent a broad category of data processing devices which are well known in the art. The device driver of the present invention is described in conjunction with a computer system operating with the disk operating system (DOS). However, any computer operating under any operating system may be used without deviating from the spirit and scope of the invention.

The computer system 100 also includes at least one peripheral device shown as peripheral device "1" through peripheral device "n" labeled 125 and 130 on FIG. 2. The peripheral devices 125 and 130 may include, for example, network interface cards, facsimile modems, and any type of computer peripheral device. In one embodiment, the bus 145 comprises an Industry Standard Architecture (ISA) bus. In a second embodiment, the bus 145 comprises a Peripheral Component Interconnect (PCI) bus. For these embodiments, the peripheral devices 125 and 130 conform to the ISA standard and PCI standard, respectively. In addition, the peripheral devices 125 and 130 may be configured in accordance with the a plug and play standard. The present invention has application for a configuration manager and driver operating in a disk operating system (DOS) and Windows™ operating system environment. As is explained fully below, the present invention provides a method for loading a device driver, such as a device driver for an ISA device, in the memory 105 to support operation of a peripheral device in the computer system 100.

Figure 3:
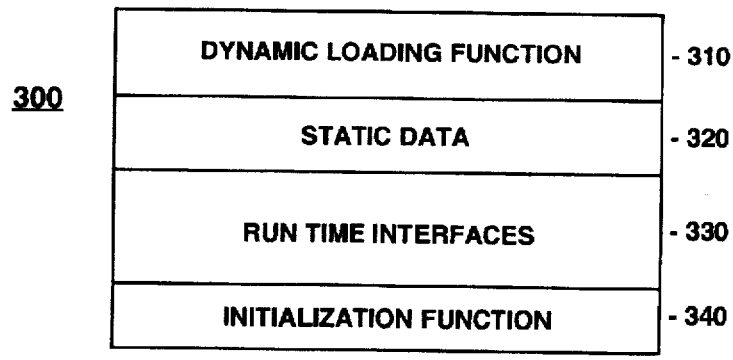
FIG. 3 is a block diagram conceptually illustrating one embodiment for the device driver of the present invention.

FIG. 3 is a block diagram conceptually illustrating one embodiment for the device driver of the present invention. The device driver 300 contains dynamic loading function 310, static data 320, run time interfaces 330, and initialization function 340. As is explained more fully below, the dynamic loading function 310 is utilized to load the run time interfaces 330 during run time. The static data 320 contains data for use by the dynamic loading function 310, run time interfaces 330, and initialization function 340. The static data 320 may be set during initialization by the initialization function 340, during loading of the run time interfaces 330 by the dynamic loading function 310, and during run time by the run time interfaces 330. The run time interfaces 330 is the portion of the device driver that is executed during run time. As is explained below, the run time interfaces 330 does not remain resident in the computer memory until access to the run time interfaces is desired. The initialization function 340 initializes the device driver 300 in accordance with the present invention.

Figure 4:
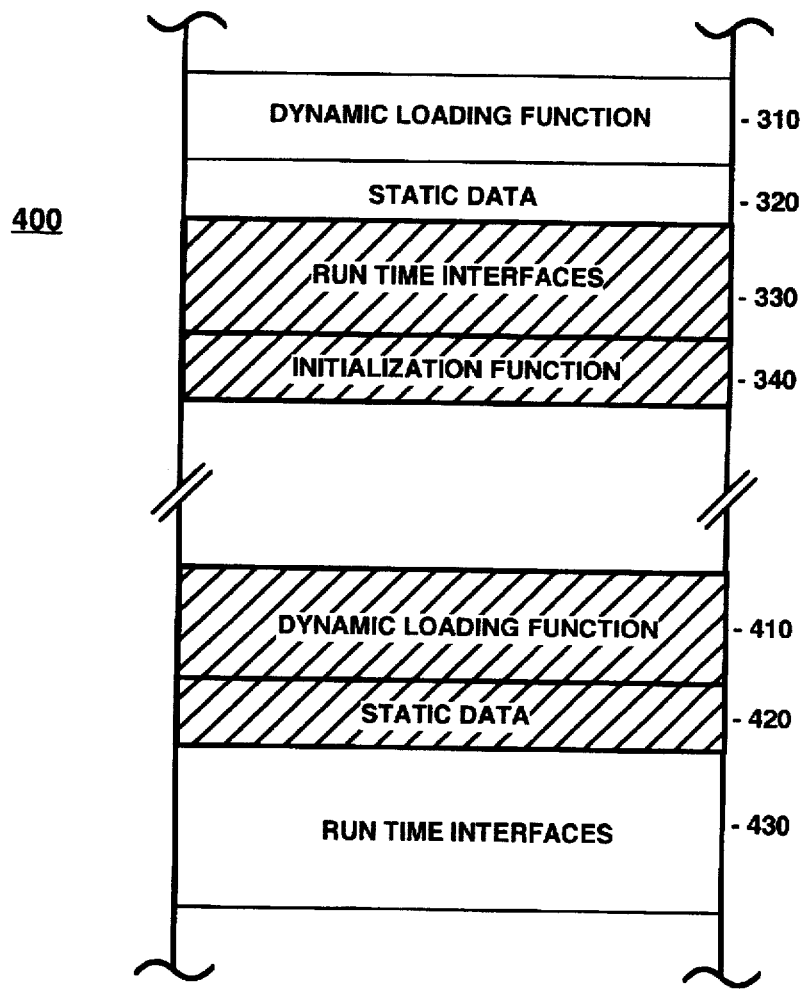
FIG. 4 is a block diagram of a memory map conceptually illustrating the operation of the dynamically loaded device driver of the present invention.

FIG. 4 is a block diagram of a memory map 400 conceptually illustrating the operation of the dynamically loaded device driver of the present invention. During initialization of the computer system, the dynamic loading function 310, static data 320, run time interfaces 330, and initialization function 340 are loaded into the memory 105 from the storage device 120. The initialization function 340 is subsequently executed to initialize the device driver 300, including setting data in the static data 320. After executing the initialization function, the device driver 300 indicates to the DOS operating system the end location for the portion of the device driver to remain resident in memory.

For purposes of explanation, the portion of the device driver that remains resident in memory after initialization is entitled the "minimum resident subset" of the device driver. In the illustrated embodiment, the minimum resident subset of the device driver of the initial copy contains the dynamic loading function 310 and the static data 320. This embodiment is illustrated in FIG. 4 such that the run time interfaces 330 and initialization function 340 are shaded to indicate that this portion of memory is free after initialization. Therefore, the DOS operating system may allocate this portion of memory for another purpose.

When the device driver 300 is accessed for interfacing the corresponding peripheral device, then the device driver, stored in the storage device 120, is loaded into a different portion of memory as indicated in the memory map 400 of FIG. 4. As shown in FIG. 4, a mirror image of the original device driver containing a dynamic loading function 410, static data 420, and run time interfaces 430 is loaded into memory. However, when accessing the mirror image of the device driver during run time, only the run time interfaces 430 are accessed. The dynamic loading function 410 and the static data 420 are shaded in FIG. 4 to illustrate that, although these portions are loaded into memory, the dynamic loading function 410 and the static data 420 are not used. As is explained more fully below, the dynamic loading function 410 and the static data 420 are loaded into memory in order to preserve the original offset of the run time interfaces 430 from the beginning of the device driver.

As shown in FIG. 4, the dynamic loading of the device driver of the present invention saves memory space in the critical conventional memory portion. For example, for a device driver that occupies 40 to 50 kilobytes (Kbytes) of memory space, the dynamic device driver technique of the present invention may reduce the space required to store the minimum device driver to only 1 Kbyte. For device drivers operating in the DOS operating system, such significant savings in memory space results in reducing the device driver memory requirements in the conventional memory area. In addition, as explained above, when generating one or more DOS VMs, additional savings is achieved in each DOS VM.

Figure 5:
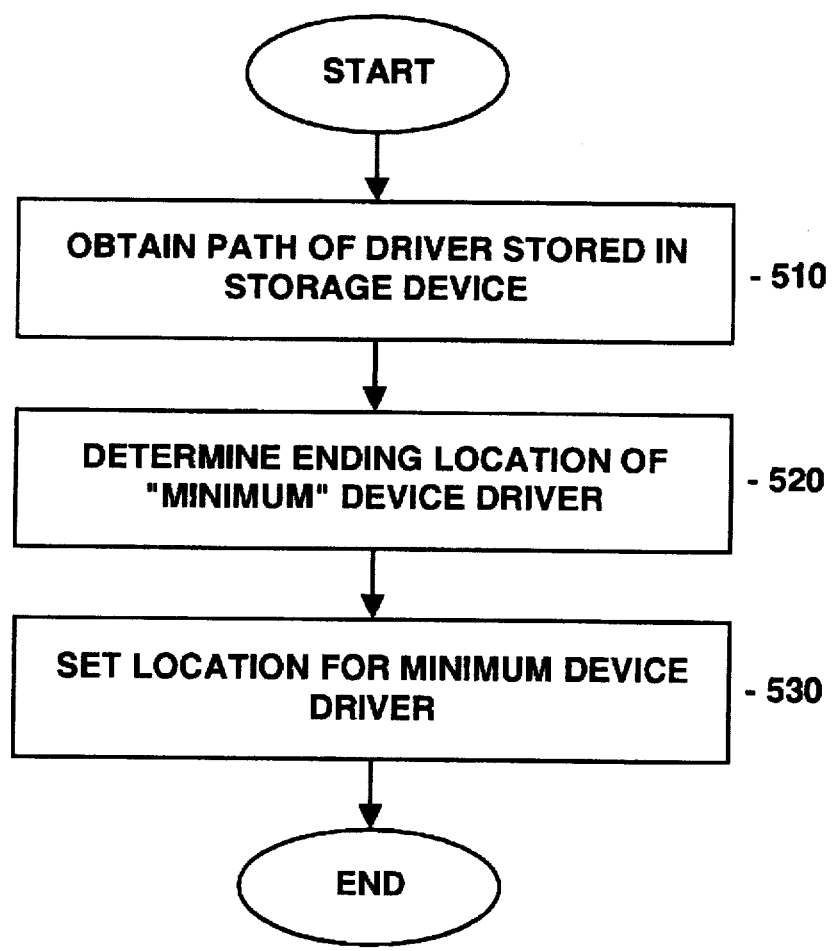
FIG. 5 is a flow chart illustrating the initialization function configured in accordance with one embodiment of the present invention.

FIG. 5 is a flow chart illustrating the initialization function configured in accordance with one embodiment of the present invention. As shown in block 510, the initialization function 340 obtains the path of the device driver stored in the storage device 120. The path of the device driver is used to load the device driver at run time. As is well known in the art for DOS, the file "config.sys" contains a line of text to identify the path for each device driver. The initialization function 340 determines the path of a particular device driver indirectly from the text line contained in the "config.sys" file. In the present invention, the initialization function 340 saves the driver path identifying the particular line of text in the "config.sys" file corresponding to the device driver. As will be explained more fully below, during run time, the dynamic loading function 310 identifies the location of the device driver in the storage device 120 from the driver path saved.

The initialization function 340 determines the ending location of the minimum resident subset of the device driver of the initial copy as shown in block 520 of FIG. 5. As discussed above, the ending location of the minimum resident subset of the device driver of the initial copy may vary depending on the particular implementation. For the embodiment of the minimum resident sunset of the device driver of the initial copy containing the dynamic loading function 310 and the static data 320, the initialization function 340 determines the ending location of the static data 320. The length of static data 320 is dependent upon the particular implementation of the device driver. For the illustrated embodiment, the static data 320 includes the text identifying the path for the location of the device driver. The actual length of the static data 320 for a particular device driver is dependent on the amount of data that must be saved for later access. When specifying the end of the static data 320, a pointer, identifying the beginning of the run time interfaces 330, is saved. In an alternative embodiment, the device driver may contain a label to identify the end location of the static data 320.

As shown in FIG. 5, the initialization function 340 sets the location for the minimum resident subset of the device driver of the initial copy as identified in block 530. As is well known in the art, DOS provides a data structure, and a device driver initialization routine provides a pointer to the data structure to identify the end of the driver routine. In the prior art, the end of the driver routine is set just prior to the beginning of the initialization code (e.g. after the run time interfaces code). In the present invention, the ending location is set by storing a pointer in the data structure to identify a memory location subsequent to the last static data location in the static data 320.

Figure 6:
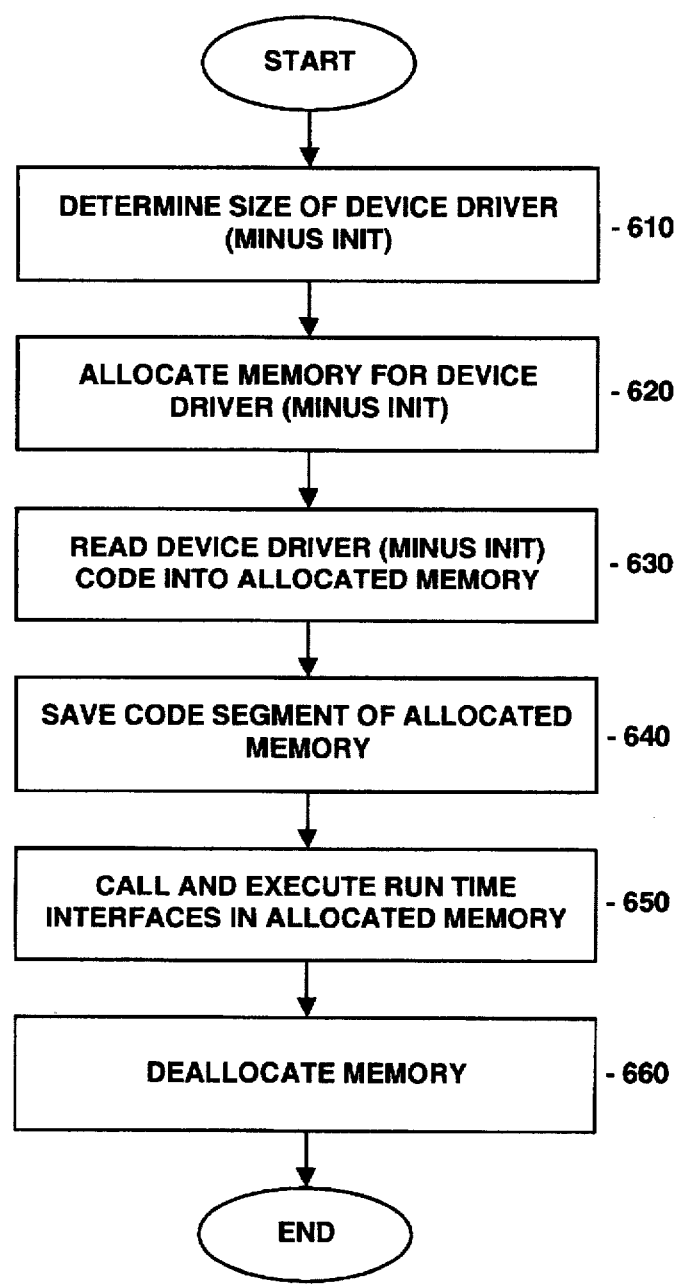
FIG. 6 is a flow chart illustrating the method of dynamically loading a device driver in accordance with one embodiment of the present invention.

FIG. 6 is a flow chart illustrating the method of dynamically loading a device driver in accordance with one embodiment of the present invention. As shown in block 610, the dynamic loading function 310 determines the size of the dynamic loading function 410, static data 420, and the run time interfaces 430 (e.g. the dynamic loading function 410, static data 420, and the run time interfaces 430 are the same size as the dynamic loading function 310, static data 320, and the run time interfaces 330, respectively). In a first embodiment, the dynamic loading function 310 determines the size of the dynamic loading function 410, static data 420, and the run time interfaces 430 from the device driver program itself. In a second embodiment, the dynamic loading function 310 determines the size from the static data 320.

For the first embodiment, the device driver contains knowledge of the particular offset to the beginning of the initialization function. The dynamic loading function 310, during initialization, accesses a variable located at a predetermined location where the initialization function 340 starts to determine the length of the dynamic loading function 310, static data 320, and the run time interfaces 330. When the dynamic loading functions accesses that variable (e.g. a variable signifying the beginning of the initialization function) then the dynamic loading function 310 receives the offset. For example, the assembly language instruction:

MOV AX, OFFSET (INIT CODE START)

may be used. Using this x-86 assembly language instruction, the offset is loaded into the AX register. Because the device driver starts at the beginning of the code segment, the offset provides the length of the dynamic loading function 310, static data 320, and the run time interfaces 330.

As shown in block 620 of FIG. 6, the dynamic loading function 310 allocates memory for the device driver (not including the initialization function). The amount of memory allocated corresponds to the previously determined size of the dynamic loading function 410, static data 420, and the run time interfaces 430. In one embodiment for DOS, an INT 21 DOS function is executed so that DOS allocates memory for the device driver (not including the initialization function). Note, for the DOS implementation, the memory allocated for the device driver (not including the initialization function) is still in the conventional memory area.

After allocating memory, the dynamic loading function 310 reads the device driver (not including the initialization function) from a storage device into the allocated memory as shown in block 630. In order to read the device driver (not including the initialization function) into the allocated memory, the dynamic loading function 310 opens the file containing the device driver utilizing the pointer to the path saved during the initialization of the device driver. In one embodiment, a DOS open function is used, along with the pointer to the path, to open the device driver file. A DOS read call is issued to read the device driver (not including the initialization function) into the allocated memory. For the DOS read call, the dynamic loading function 310 passes the code segment and the size of the device driver (not including the initialization function) for the read. In addition, the dynamic loading function 310 executes a close file call to close the device driver file.

The dynamic loading function 310 saves the code segment of the allocated memory as shown in block 640 in FIG. 6. The saving of the code segment for the memory allocated permits determination of the entry point into the run time interfaces 430. In one embodiment, a pointer to the code segment is stored. The pointer to the code segment is utilized for both deallocating the memory and for building a pointer to call the run time interfaces 430.

As shown in block 650 in FIG. 6, the dynamic loading function 310 calls the run time interfaces 430 in the allocated memory. In order to call the run time interfaces 430, the dynamic loading function 310 uses the saved code segment for the allocated memory and the original offset of the run time interfaces 330. Because the dynamic loading function 410, static data 420, and run time interfaces 430 is a mirror image of the dynamic loading function 310, static data 320, and run time interfaces 330, the offset from the original run time interfaces 330 is the same offset to the run time interfaces 430. Therefore, this offset with the code segment of the allocated memory identifies the run time interfaces 430.

The offset to the beginning of the run time interfaces 330 may be obtained in a manner similar to determining the offset of the initialization function 340, discussed above. In one embodiment, a variable, that is located at the beginning of the run time interfaces 330, is accessed such that a particular value indicates the starting address of the run time interfaces 330. In order to build a pointer to the run time interfaces 430 in the allocated memory, the dynamic loading function 310 uses the offset obtained and the code segment stored in step 640. This segment:offset provides a pointer to the beginning of the run time interfaces 430.

After the run time interfaces 430 are executed, the dynamic loading function 310 deallocates the memory storing the dynamic loading function 410, static data 420 and run time interfaces 430 as shown in block 660 in FIG. 6. By deallocating the memory, DOS is free to use the memory for another application or function. A standard DOS deallocate memory call may be utilized for this function.

As discussed above, in the preferred embodiment, the loading of the mirror image of the device driver in the allocated memory permits use of the same offsets to the run time interfaces. By using the same offsets, the calling of the run time interfaces 430, at run time, is greatly simplified. Also, when executing the run time interfaces 430, the current data segment from the originally loaded device driver remains intact (e.g. the data segment stored in the microprocessor segment register identifies the data segment for the static data 320). Because of this, the run time interfaces 430 access the static data 320 directly without any modification to the run time interfaces 430. As is well known in the art for initializing device drivers, data, such as the static data 320, are set at initialization. The static data 320 set at initialization is directly accessible by the run time interfaces 430.

In one embodiment for the device driver of the present invention, the device driver, during initialization, prompts the user to indicate whether the run time interfaces are to remain resident in memory after the initialization period or be dynamically loaded during run time. For this embodiment providing an option, if the run time interfaces 430 is to be loaded dynamically, then the pointer to the DOS data structure indicating the end of the device driver is set to the end of the static data 320. Alternatively, if the user indicates that the entire device driver is to remain resident in the conventional memory area, then the pointer to the DOS structure is set to the end of the run time interfaces 330.

The present invention provides the option to use the dynamic loading function because dynamically loading the run time interfaces is not suitable for all applications. For example, the dynamic loading has constraints on the response time for executing the run time interfaces. Furthermore, if the storage device, such as a hard disk drive, isn't available for access during the execution of the run time interfaces, then the run time interfaces must remain resident in memory after the initialization. Furthermore, if applications resident in the conventional memory area during run time of the device driver are too large, then the run time interfaces may not be loaded at run time due to a lack of memory space.

During initialization, some device drivers may require access to the run time interfaces in the dynamically loaded device driver of the present invention. In order to support this, the present invention stores the run time interfaces at the end of the initialization memory segment. This area, at the end of the memory segment, is later controlled by the DOS operating system. Note that memory cannot be allocated to store the run time interfaces during the initialization period because the DOS allocation function is not available to the device driver at this time. However, the area at the end of the memory segment may be overwritten by another routine during the initialization period. Therefore, if the run time interfaces program stored at the end of the memory segment is called during the initialization period, then the device driver executes a checksum to determine whether the run time interfaces program remains in tact. If the checksum fails, then the call to the run time interfaces returns an error message. However, if the checksum is valid, the call to the run time interfaces is executed.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method for dynamically loading a device driver in a computer system memory, said method comprising the steps of:

loading an initial copy of the device driver from a storage device into said computer system memory during an initialization period;

initializing said device driver;

upon initialization, retaining a minimum resident subset of the device driver in said computer system memory using the initial copy, thereby reducing the amount of computer system memory required to store said device driver;

loading a subsequent copy of said device driver from said storage device into said computer system memory when execution of said device driver is required after said initialization period, said subsequent copy of said device driver comprising at least said minimum resident subset and a dynamically loaded subset of the device driver; and executing said device driver utilizing both said minimum resident subset of the device driver of the initial copy and said dynamically loaded subset of said device driver of the subsequent copy.

2. The method as set forth in claim 1, wherein said operating system comprises a disk operating system (DOS).

3. The method as set forth in claim 1, wherein said device driver comprises a dynamic loading function, static data, at least one run time interface, and an initialization function.

4. The method as set forth in claim 3, wherein the step of retaining a minimum resident subset of the device driver using the initial copy for storage comprises the step of identifying, to said operating system said dynamic loading function and said static data as said minimum resident subset of the device driver.

5. The method as set forth in claim 1, wherein the step of initializing said device driver comprises the steps of:

obtaining a path for said device driver stored in said storage device;

storing said path of said device driver;

determining an ending location of said minimum resident subset of the device driver of the initial copy; and communicating, to said operating system, said ending location of said minimum resident subset of the device driver of the initial copy.

6. The method as set forth in claim 1, wherein the step of loading a subsequent copy of said device driver comprises the steps of:

allocating memory for said subsequent copy of said device driver when execution of said device driver is required; and reading said subsequent copy of said device driver from said storage device into said allocated memory.

7. The method as set forth in claim 1, wherein the step of executing said device driver utilizing both said minimum resident subset of the device driver of the initial copy and said dynamically loaded subset of said device driver of the subsequent copy comprises the steps of:

storing a code segment into said allocated memory, said code segment being said subsequent copy of said device driver;

determining an offset to a starting location of run time interfaces that are members of said dynamically loaded subset of the device driver;

building a pointer with said code segment and said offset; and calling said run time interfaces residing in said allocated memory with said pointer.

8. The method as set forth in claim 1, further comprising the steps of:

providing a user of the computer system with an option to either dynamically load a subsequent copy of said device driver, or to permanently store an entire copy of said device driver in said computer system memory during initialization; and permanently storing all of said device driver in said computer system memory when said user so elects.

9. A computer system comprising:

a processor unit;

a memory coupled to the processor unit;

at least one peripheral device coupled to said processor unit;

an operating system that operates said computer system; and a storage device, coupled to said processor, that stores a device driver for said at least one peripheral device, an initial copy of said device driver being loaded into said memory from said storage device during an initialization period, said initial copy of said device driver comprising:

an initialization function that initializes said initial copy of the device driver in said computer system memory and specifies to said operating system a minimum resident subset of the device driver which is to be retained in said computer system memory using the initial copy, thereby reducing the amount of memory required to store said device driver in said computer system memory; and a dynamic loading function that loads a subsequent copy of said device driver from said storage device into said computer system memory in response to a call to said device driver from said processor unit, said subsequent copy of said device driver comprising at least said minimum resident subset and a dynamically loaded subset of the device driver, said processor unit utilizing both said minimum resident subset of the device driver of the initial copy and said dynamically loaded subset of said device driver of the subsequent copy to execute said device driver.

10. The computer system as set forth in claim 9, wherein said operating system comprises at least a disk operating system (DOS).

11. The computer system as set forth in claim 9, wherein said device driver further comprises at least one run time interface and static data.

12. The computer system as set forth in claim 11, wherein said minimum resident subset of the device driver comprises said dynamic loading function and said static data.

13. The computer system as set forth in claim 11, wherein said dynamic loading function comprises:

a pointer building function that stores a code segment for said allocated memory wherein said code segment is said subsequent copy of said device driver, that determines an offset to a starting location of said run time interfaces that are members of said dynamically loaded subset of the device driver, and that builds a pointer with said code segment and said offset; and a calling function that calls said run time interfaces residing in said allocated memory with said pointer.

14. The computer system as set forth in claim 11, wherein said dynamic loading function comprises:

a driver location building function that stores an execution location for said allocated memory, that determines a starting location of said run time interfaces that are members of said dynamically loaded subset of the device driver, and that builds a run-time environment to allow execution at said starting location; and a calling function that calls said run time interface residing in said allocated memory at said starting location.

15. The computer system as set forth in claim 9, wherein said initialization function comprises:

a device driver identification function that obtains a path for said device driver stored in said storage device, and that stores said path of said device driver; and a device driver size function that determines an ending location of said minimum resident subset of the device driver of the initial copy, and that communicates, to said operating system, said ending location of said minimum resident subset of the device driver of the initial copy.

16. The computer system as set forth in claim 9, wherein said dynamic loading function comprises:

an allocation function that allocates memory from said memory of said computer system for said subsequent copy of said device driver when a call is made to said device driver; and a reading function that reads said subsequent copy of said device driver from said storage device into said allocated memory.

17. The computer system as set forth in claim 9, wherein said at least one peripheral device comprises a peripheral device configured in accordance with an Industry Standard Architecture (ISA) standard.

18. A method for dynamically loading a device driver in a computer system memory operating under a DOS operating system, said method comprising the steps of:

loading an initial copy of the device driver from a storage device into memory, during a DOS initialization period, said initial copy device driver including a dynamic loading function, run time interfaces, and an initialization routine;

initializing said device driver;

upon initialization specifying to said DOS operating system an ending location for a minimum resident subset of said device driver to identify and retain in computer system memory using said initial copy, wherein said ending location does not include run time interfaces nor an initialization routine thereby reducing the amount of computer system memory used to store said device driver;

allocating memory for said run time interfaces when execution of said device driver is invoked by said DOS operating system;

loading into said allocated memory said run time interfaces of said device driver from said storage device using a subsequent copy of the device driver;

executing said run time interfaces; and deallocating memory allocated to said run time interfaces so as to free computer system memory.

19. The method as set forth in claim 18, wherein the step of initializing said device driver comprises the steps of:

obtaining a path for said device driver stored in said storage device;

storing said path for said device driver;

determining an ending location of said minimum resident subset of the device driver of the initial copy; and communicating, to said operating system, said ending location of said minimum resident subset of the device driver of the initial copy.

20. The method as set forth in claim 18, wherein:

the step of loading said run time interfaces comprises the steps of:

allocating memory for said run time interfaces when execution of said device driver is required; and reading said run time interfaces from said device driver stored on said storage device into said allocated memory; and the step of calling said run time interfaces comprises the steps of:

storing a code segment for said allocated memory, said code segment being said subsequent copy of said device driver;

determining an offset to a starting location of said run time interfaces that are members of said dynamically loaded subset of the device driver of the subsequent copy;

building a pointer with said code segment and said offset; and calling said run time interfaces residing in said allocated memory with said pointer.

* * * * *

UNITED STATES PATENT AND TRADEMARK OFFICE
CERTIFICATE OF CORRECTION

PATENT NO. : 5,701,476
DATED : December 23, 1997
INVENTOR(S) : Russell J. Fenger It is certified that error appears in the above-identified patent and that said Letters Patent is hereby corrected as shown below:

In column 3 at line 56 delete "with the a plug" and insert --with a plug--

In column 5 at line 24 delete "sunset" and insert --subset--

In column 6 at line 2 insert --address-- prior to "location"

In column 6 at line 5 delete "functions" and insert --function--

Signed and Sealed this

Twenty-fifth Day of August, 1998

*Attest:*

BRUCE LEHMAN

*Attesting Officer*   *Commissioner of Patents and Trademarks*